United States Patent [19]
Fischle et al.

[11] Patent Number: 5,601,347
[45] Date of Patent: Feb. 11, 1997

[54] MOTOR VEHICLE TRACTION SYSTEM CONTROL OSCILLATION DAMPING METHOD USING LOW-ADHESION WHEEL BRAKE INTERVENTION

[75] Inventors: Gerhard Fischle, Esslingen; Matthias Baumann, Boeblingen; Ralph Klingel, Wimsheim; Carola Pfister, Plochingen, all of Germany

[73] Assignee: Mercedes-Benz AG, Germany

[21] Appl. No.: 453,002

[22] Filed: May 30, 1995

[30] Foreign Application Priority Data

May 28, 1994 [DE] Germany .......................... 44 18 769.6

[51] Int. Cl.⁶ .............. B60T 8/32; B60K 28/16
[52] U.S. Cl. .............. 303/191; 303/139; 303/169
[58] Field of Search .................. 303/139, 145, 303/146, 147, 148, 149, 165, DIG. 6, DIG. 8, 113.2, 113.3, 169, 176, 191, 196, 199, 140, 195, 196; 188/181 C; 180/197; 364/426.02

[56] References Cited

U.S. PATENT DOCUMENTS

| | | | |
|---|---|---|---|
| 4,349,233 | 9/1982 | Bullard et al. | 303/145 |
| 4,571,010 | 2/1986 | Dittner et al. | 303/139 |
| 4,701,855 | 10/1987 | Fennel . | |
| 4,967,866 | 11/1990 | Maehars . | |
| 5,193,889 | 3/1993 | Schaefer et al. | 303/139 |
| 5,267,784 | 12/1993 | Müller et al. | 303/195 |

FOREIGN PATENT DOCUMENTS

| | | |
|---|---|---|
| 2756192A1 | 6/1978 | Germany . |
| 3236366 | 10/1982 | Germany . |
| 4022471A1 | 1/1992 | Germany . |
| 2128278 | 4/1984 | United Kingdom . |

OTHER PUBLICATIONS

Ausgebremst, Auto–Motor–Sport Test & Technik, 3 pages.
Antriebsschlupfregelung im IRVW 3 (ASR), Bernd–Guido Schulze et al., Automobil–Industrie Feb. 1986, pp. 137–143.

*Primary Examiner*—Douglas C. Butler
*Attorney, Agent, or Firm*—Evenson, McKeown, Edwards & Lenahan, P.L.L.C.

[57] ABSTRACT

A method for electronic traction systems using brake intervention on the low-adhesion wheel damps and thereby substantially avoids the undesired traction control oscillations, such as pull-away tramping and drive train oscillations. In particular, an interchange of the low-adhesion wheel to be controlled from one driving wheel to the other is undertaken only when the rotational speed of the previous high-adhesion wheel is greater by a certain amount than that of the previous low-adhesion wheel and when there is no longer any controlling brake pressure at the latter. Also or in addition, the threshold value for the activation of the brake intervention is set to increase traction dynamically by suitably raising the threshold value when drive train oscillation behavior is recognized.

16 Claims, 3 Drawing Sheets

MOTOR VEHICLE TRACTION SYSTEM CONTROL OSCILLATION DAMPING METHOD USING LOW-ADHESION WHEEL BRAKE INTERVENTION

CROSS-REFERENCE TO RELATED APPLICATIONS

This application is related to application Ser. No. 08/449,660 filed May 24, 1995, now U.S. Pat. No. 5,479,811, for "PROCEDURE FOR CALIBRATION THE WHEEL SPEEDS FOR A MOTOR VEHICLE" in the name of Matthias BAUMANN et al.; application Ser. No. 08/452,532 filed May 30, 1995, now U.S. Pat. No. 5,556,176, for "METHOD FOR CONTROLLING VEHICLE BRAKE PRESSURE AS A FUNCTION OF THE DEVIATION OF THE ACTUAL SLIP OF WHEELS RELATIVE TO A DESIRED SLIP" in the name of Peter BÖSCH et al.; and application Ser. No. 08/452,994 filed May 30, 1995, for "METHOD FOR INCREASING DRIVE TORQUE WITH CONTROLLED BRAKE ENGAGEMENT" in the name of Gerhard FISCHLE et al.

BACKGROUND AND SUMMARY OF THE INVENTION

The present invention relates to a method of damping control oscillations of a motor vehicle traction control system operating by brake intervention on the low-adhesion wheel.

Electronic traction systems, in general, provide for brake intervention on the wheel first tending to spin, the so-called low-adhesion wheel as described, for example, in the article "Ausgebremst" in the Auto-Motor-Sport Journal of Aug. 2, 1986, p. 34. Such situations arise, in particular, where different friction coefficients are present for the driving wheels. Because of the one-sided brake intervention on the low-adhesion wheel, a corresponding traction-increasing lock torque is transmitted to the high-adhesion wheel. Consequently, such systems replace the automatic differential lock which is also used for this purpose.

When such an electronic traction system is employed, the danger exists that the traction control may exhibit undesirable control oscillation behavior which can, for example, lead to the so-called pull-away tramping effect or to so-called drive train oscillations. The pull-away tramping effect is based on the two driving wheels frequently interchanging low-adhesion wheel and high-adhesion wheel behavior. It is a particular danger where low friction coefficients are present at both driving wheels because, as a rule, the friction coefficient and the wheel loads never agree completely and the two wheels do not, therefore, start to spin simultaneously. The driving wheel which spins first then represents the low-adhesion wheel for a traction control system but the opposite high-adhesion wheel would usually also spin a short time later, even without low-wheel brake intervention. This tendency is further amplified by the build-up of pressure for traction control purposes on the low-adhesion wheel. This can now lead to the high-adhesion wheel spinning, whereas the low-adhesion wheel slip is reduced to a very low value.

Consequently, the low-adhesion wheel to be controlled in the known method is now the previous high-adhesion wheel instead of the previous low-adhesion wheel. Pressure is then reduced at the new high-adhesion wheel whereas pressure is built up at the new low-adhesion wheel. Because of the low friction coefficient, however, the new high-adhesion wheel cannot, in turn, offer the necessary supporting torque and it spins once again. If countermeasures are not taken, this procedure occurs cyclically and causes high-frequency wheel oscillations and a saw-tooth-like build-up and reduction of pressure on alternate sides. This is referred to as pull-away tramping.

A further reason for undesirable traction control oscillations in these known systems is due, in large part, to an exponential variation of the slip/friction coefficient characteristic which exhibits a maximum. Such a variation appears, for example, in the case of ice with an adhesion maximum or on wet grass. The result of this characteristic curve is that a driving wheel which is initially in a slip range with a high friction coefficient can deliver a relatively large traction torque until it leaves the limiting friction condition and enters the sliding friction condition. The adhesion is simultaneously reduced due to the increase in slip so that traction control is initiated and brake pressure is built up in this wheel, which is treated as the low-adhesion wheel, in order to control the traction. This reduces the slip again. Because of the decreasing slip, however, the friction coefficient is simultaneously increased once again. The low-adhesion wheel is therefore braked even more strongly so that it runs almost without slip. This causes the pressure to be reduced once again until the low-adhesion wheel again begins to spin. The drive train is excited to oscillation by repetition of this overshoot in the traction control and driving comfort can be disturbingly impaired.

DE 32 36 366 A1 describes a device for utilizing the possible adhesion coefficients of two vehicle wheels driven by a differential gear. The brake intervention on the more rapidly rotating low-adhesion wheel takes place with a continually increasing braking effect when the rotational speed difference between the driving wheels exceeds a specified threshold value. This continues until the rotational speed of the low-adhesion wheel has again fallen below the threshold value and both wheels have, therefore, approximately the same rotational speed. After the low-adhesion wheel has fallen below the threshold value, the low-adhesion wheel brake pressure is reduced in accordance with a specified pressure gradient. If the rotational speed of the previous high-adhesion wheel now increases above the rotational speed of the low-adhesion wheel by the specified threshold amount before the reduction in brake pressure at the low-adhesion wheel has ended, a brake intervention to control traction is initiated at the previous high-adhesion wheel while, at the same time, brake pressure is still present at the previous low-adhesion wheel.

DE 27 56 192 A1 describes a device for controlling the torque transmitted to the driving wheels of a motor vehicle via a differential gear. Magnetic valves which effect the activation and deactivation of the driving wheel brakes are triggered so that braking is effected on that driving wheel whose acceleration exceeds an acceleration threshold value when the speed of the driving wheels is above a specified speed threshold value and when the other driving wheel is not accelerated with an acceleration value located above the acceleration threshold value. A release of the brake is effected on that driving wheel on which the brake has acted when its rotational speed decreases and/or the other driving wheel accelerates and as soon as the speed difference between the two driving wheels is smaller than a specified speed difference threshold value. Only one magnetic valve at a time can be switched on for brake activation. An interchange from a low-adhesion wheel whose traction was previously controlled by a brake intervention to traction control on the previous high-adhesion wheel by corresponding brake action has already taken place, inter alia, when the acceleration of the previous high-adhesion wheel exceeds the specified acceleration threshold value. The brake on the previous low-adhesion wheel is then simultaneously deactivated and that on the previous high-adhesion wheel is activated. This takes place independently of whether the rotational speed at the previous high-adhesion wheel is or is not greater than that at the previous low-adhesion wheel.

It is an object of the present invention to provide a method which substantially avoids disturbing control oscillations of an electronic traction system, in particular pull-away tramping and/or drive train oscillation effects.

The foregoing object has been achieved in accordance with the present invention by a method in which an interchange of the low-adhesion wheel to be controlled from one driving wheel to an opposite driving wheel occurs, at the earliest, when a rotational speed of a previous high-adhesion wheel is greater by a specified value than the rotational speed of the previous low-adhesion wheel and when there is no longer any brake pressure at the previous low-adhesion wheel or a variation with time of a magnitude of slip difference between the driving wheels and, raising by a specified amount, when oscillation behavior of the same is recognized, an activation threshold value for activating a traction-increasing brake intervention on the low-adhesion wheel.

Thereby, an excessively frequent interchange of low-adhesion wheel and high-adhesion wheel between the driving wheels is prevented by the method of the present invention. A counteraction for the pull-away tramping effect, in particular, occurs because such interchange does not take place as soon as the high-adhesion wheel slip becomes equal to the low-adhesion wheel slip but only when the former is greater than the low-adhesion wheel slip by a specified amount and when, in addition, there is no longer any brake pressure present at the low-adhesion wheel from a previous traction control procedure. Furthermore, the brake pressure at the previous low-adhesion wheel is always reduced completely before a new traction control procedure begins at the previous high-adhesion wheel as the potential new low-adhesion wheel in accordance with the present invention.

A mode of operation according to another embodiment of the present invention prevents drive train oscillation behavior because the variation with time of the magnitude of the driving wheel slip difference, which is used as the control parameter, is recorded. If oscillation behavior of this driving wheel slip difference is recognized, the threshold value for activating a particular traction control procedure is raised. This reduces the frequency of alternating activation, and deactivation of the traction control system and the control therefore is made smoother.

A low-adhesion/high-adhesion wheel interchange is not permitted in accordance with the present invention until a specified hysteresis period has elapsed after a previous interchange and provides additional damping of the pull-away tramping effect. Because this effect is more disturbing at relatively high speeds than at low speeds, the hysteresis period is preferably fixed as a function of the vehicle speed. Especially in the case of active traction control, such a low-adhesion/high-adhesion wheel interchange is only permitted when the vehicle speed is below a specified value. This counteracts the tramping on alternate sides at relatively high speeds whereas, in the low speed range in the case of a friction coefficient split, the pull-away traction is improved.

A further aspect of the present invention makes available a variable increase, which is matched to the situation, in the activation threshold for the traction control by setting the new threshold value in each case to the last maximum recognized in the slip difference curve plus a fixed offset value. In contrast to the selection of a static activation threshold which is much too high for certain friction coefficient relationships, this approach achieves a variable, dynamic increase in the activation slip threshold, which is matched in the best possible manner to the different driving surface conditions so that even the worst possible case is also covered.

An offset value is preferred which is larger than the difference between, on one hand, the activation threshold value and, on the other hand, a deactivation threshold value which is used for deactivating a traction control procedure. In the case of an increase in the activation threshold value, therefore, the magnitude of the actual slip difference is below the deactivation threshold so that the traction control initiates a reduction in pressure, and the low-adhesion wheel slip can increase further in order to counteract an increase in the drive train oscillation.

A further feature of the present invention makes available an advantageous way of reliably recognizing drive train oscillation behavior.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
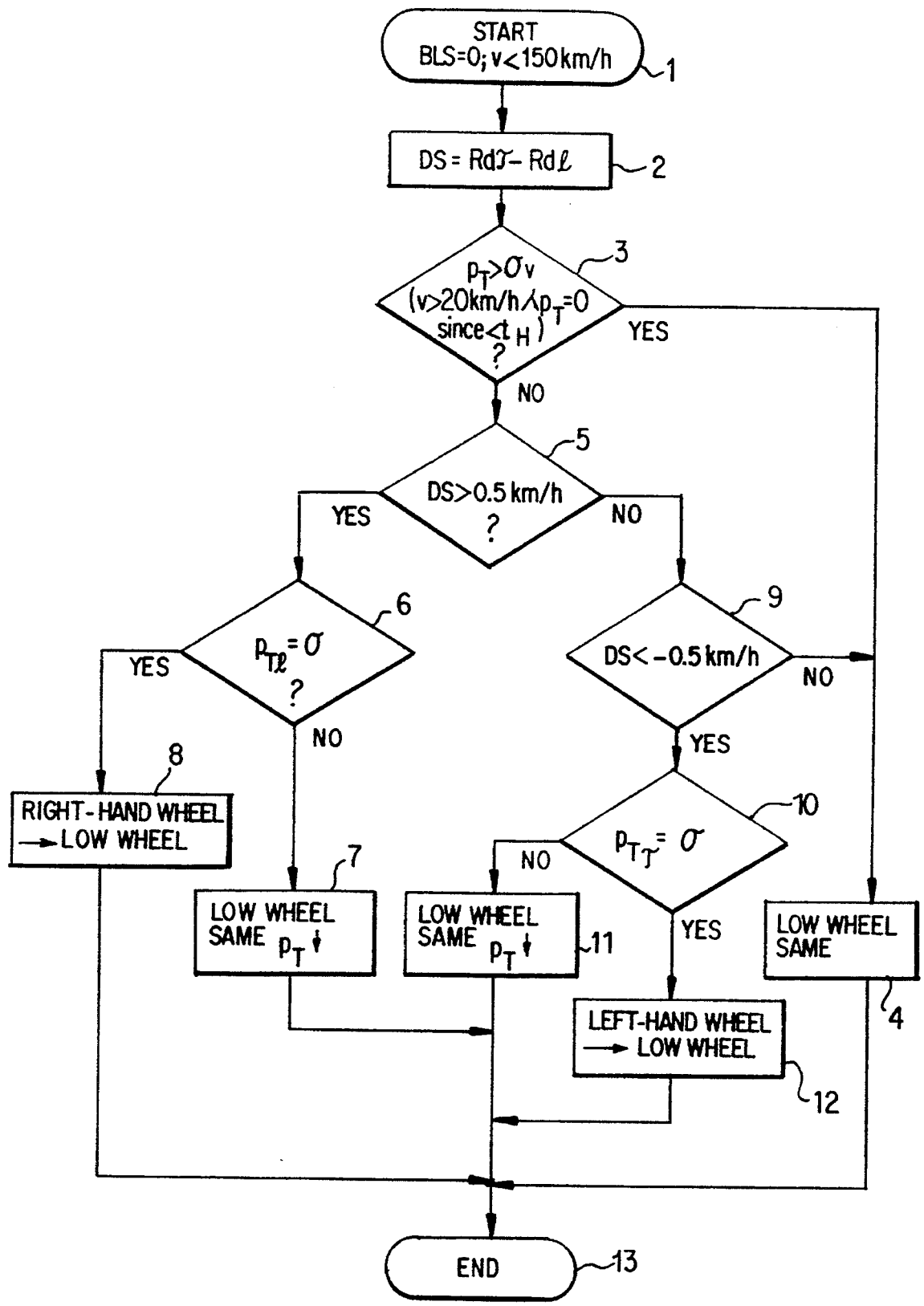
FIGS. 1 and 3 are program flow diagrams of a part of a method for damping the pull-away tramping effect within an electronic traction control system for a motor vehicle.

The part program of a method within an electronic traction system in a motor vehicle shown in FIG. 1 acts mainly against the above-mentioned problem of the pull-away tramping effect, i.e. undesirably frequent low-adhesion/high-adhesion wheel interchange, particularly in the case of low friction coefficients at the driving wheels on both sides. Like the other part programs of the electronic traction control system, this part program is run through cyclically during a specified time cycle when the appropriate conditions are present.

A cycle for damping the pull-away tramping effect is in each case introduced by an initial Step 1 if an existing brake light switch (BLS) indicates that no braking action has been undertaken by the driver.

In this process, the rotational speeds of the vehicle wheels are continuously recorded by the system and are used, inter alia, for determining the speed of the vehicle. In addition, the filtered and Ackermann-corrected wheel speeds of the driving wheels are used in a next Step 2 to determine the wheel slip difference (DS) between the wheel speed (Rdr) of the right-hand driving wheel and the wheel speed (Rdl) of the left-hand driving wheel. This driving wheel slip difference is used as the control parameter for the actual electronic traction control, which attempts to keep the low-adhesion wheel, i.e. the driving wheel with the respectively lower initial adhesion (and therefore the larger slip) within a specified slip range with an appropriate brake intervention.

As has been described above, the brake intervention at the low-adhesion wheel can, under certain driving situations, amplify the tendency of the high-adhesion wheel to spin so that the latter begins to turn more rapidly than the previous low-adhesion wheel. As a result, an interchange between the low-adhesion/high-adhesion wheel properties is demanded. In order to avoid excessively frequent interchanges of this type, and therefore to damp the pull-away tramping, the program is now continued as follows.

An interrogation (Step 3) determines whether the traction-controlling brake pressure ($P_T$) is still present at the previous low-adhesion wheel, i.e. whether traction control is still active or whether, at a vehicle speed (determined by the wheel rotational speeds) of more than 20 km/h, this low-adhesion wheel brake pressure has only been zero for a time (t) which is less than a fixed hysteresis period ($t_H$). This latter period is set to, for example, 600 ms. If one of the two alternatives is present, the same wheel continues to be treated as the low-adhesion wheel (Step 4). The information as to whether the right-hand or the left-hand driving wheel forms the low-adhesion wheel is carried by a corresponding flag bit in the conventional control electronics. The selection of the hysteresis period as a function of speed, this period being set to zero at speeds below 20 km/h and to 600 ms at speeds above 20 km/h, has the function of acting against the tramping on alternate sides at higher speeds and permitting the interchange without time delay in the low speed range in order to improve the traction in this range when a friction coefficient split is present.

If, however, neither of the two alternatives appears in the interrogation Step 3, which means that a low-adhesion wheel brake pressure which increases the traction is no longer present either at a speed below 20 km/h or for a time (t) greater than the hysteresis period ($t_H$) in the speed range above 20 km/h, the program is continued with an interrogation Step 5 which checks whether the driving wheel slip difference, as determined above, has exceeded a specified threshold value which, in the present example, is set to +0.5 km/h. If the answer is positive, the right-hand driving wheel is beginning to spin, and now the program continues with an interrogation Step 6 which determines whether the brake pressure ($P_T$) in the left-hand driving wheel is zero. If this is not the case, the left-hand wheel has, up to now, been the low-adhesion wheel whose drive slip is controlled by the traction system and that brake pressure is still present in this wheel to control the traction.

Because, according to the present invention, a low-adhesion/high-adhesion wheel interchange should not take place while low-adhesion wheel brake pressure is still present to control the traction, the left-hand driving wheel is in this case retained as the low-adhesion wheel for traction control purposes and the pressure there is lowered first (Step 7). If, on the other hand, the previous interrogation Step 6 has found that there is no longer any brake pressure controlling the drive slip in the left-hand wheel, i.e. there is no longer any active traction control there, the low-adhesion wheel flag bit for the traction control is set such that the right-hand driving wheel now forms the low-adhesion wheel which is subjected in what follows to the brake pressure interventions which increase traction (Step 8).

If, on the other hand, the interrogation Step 5 has determined that the wheel speed difference (DS) has not exceeded the threshold value of +0.5 km/h, the process is continued by a further interrogation Step 9 which checks whether this wheel speed difference (DS) between the driving wheels has dropped below a lower threshold value of −0.5 km/h. It may be seen that a hysteresis band is specified in a symmetrical manner by the two threshold values of −0.5 km/h and +0.5 km/h which has the effect that a low-adhesion/high-adhesion wheel interchange does not take place immediately in the case of an interchange of sign in the driving wheel slip difference (DS) but only when the previous high-adhesion wheel rotates more rapidly by the corresponding amount than the previous low-adhesion wheel subjected to the brake intervention to control traction. This approach makes a marked contribution to making the low-adhesion/high-adhesion wheel interchanges smoother and therefore to damping the pull-away tramping phenomena.

Correspondingly, in the case where the interrogation Step 9 is answered in the negative which, together with a negative answer to the interrogation in Step 5, means that the driving wheel slip difference (DS) is located within the hysteresis band given by the two threshold values, a jump then occurs to Step 4. Thus, the previously existing low-adhesion wheel and high-adhesion wheel distribution between the two driving wheels, and therefore the corresponding flag bit, remain unaltered. If, however, a positive answer is given to the interrogation in Step 9, this is recognized as spinning of the left-hand driving wheel and, in an analogous manner to that for the positive answer to the interrogation Step 5, the program is continued with an interrogation Step 10 which checks whether traction control brake pressure is still present in the right-hand driving wheel. If this is not the case, no low-adhesion/high-adhesion wheel interchange takes place. Rather, the brake pressure is first of all reduced first in the right-hand driving wheel so that the flag bit also remains correspondingly unaltered with respect to the low-adhesion wheel property (Step 11). If, on the other hand, the interrogation Step 10 determines that an active brake-pressure traction control is no longer present in the right-hand driving wheel, the left-hand driving wheel is determined as being the low-adhesion wheel which has to be subjected to traction control brake intervention from then on. This is input into the traction control system by corresponding setting of the low-adhesion wheel and high-adhesion wheel distribution flag bit.

In each of the possible cases for ending a method cycle as shown in FIG. 1, i.e. after Step 4, 7, 8, 11 or 12, the process is continued with further traction control program sections as symbolized by the end function block (Step 13) of the part of the method shown in FIG. 1. The method section shown in FIG. 1 provides effective damping of the pull-away tramping effect by suppressing excessively frequent low-adhesion/high-adhesion wheel interchange because, in the first place, a driving wheel slip difference hysteresis band is created by a negative lower and a positive upper threshold value. In the second place, a low-adhesion/high-adhesion wheel interchange only takes place if a traction-controlling brake pressure previously present at the previously more slowly rotating driving wheel has been reduced and, depending on the instantaneous vehicle speed, a hysteresis period which can be specified as a function of speed has elapsed since the attainment of the condition in which the previous low-adhesion wheel is not subject to brake pressure. Of course, the various numerical values given above are only exemplary, and the corresponding parameters can be suitably modified to match the particular application.

Figure 3:
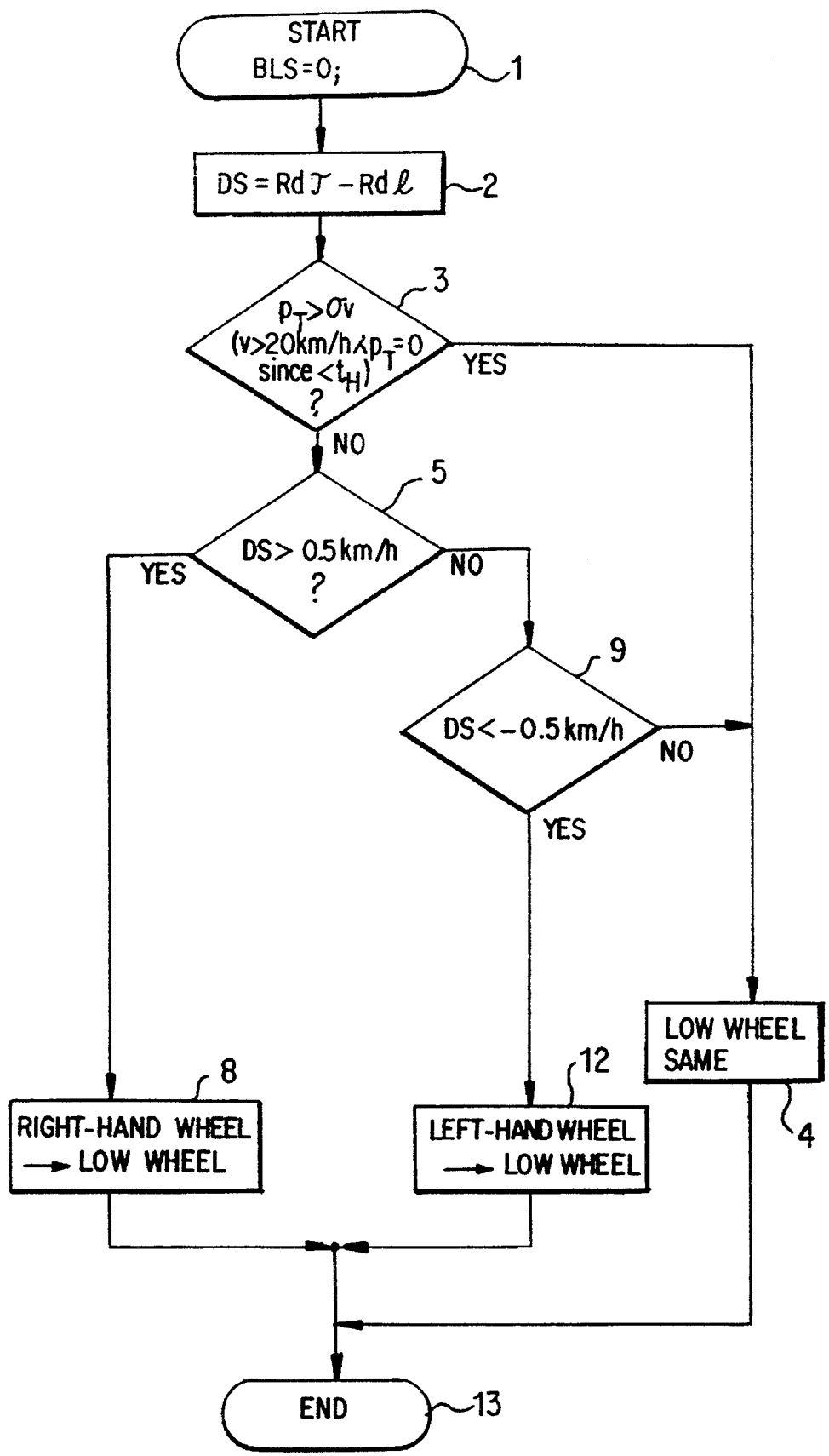

A program flow diagram, which is simplified relative to FIG. 1, of a part of a method for preventing the pull-away tramping effect within an electronic traction control system is shown in FIG. 3. Because the traction-controlling brake pressure to control traction is interrogated in Step 3 of FIG. 3, the Steps 6, 7 and 10, 11 of FIG. 1 can be omitted because the interrogation in Step 3 is independent of the side of the vehicle on which the control intervention takes place. It is, therefore, also not absolutely necessary to distinguish between the vehicle sides, with or without a control intervention, in the later course of the method.

Figure 2:
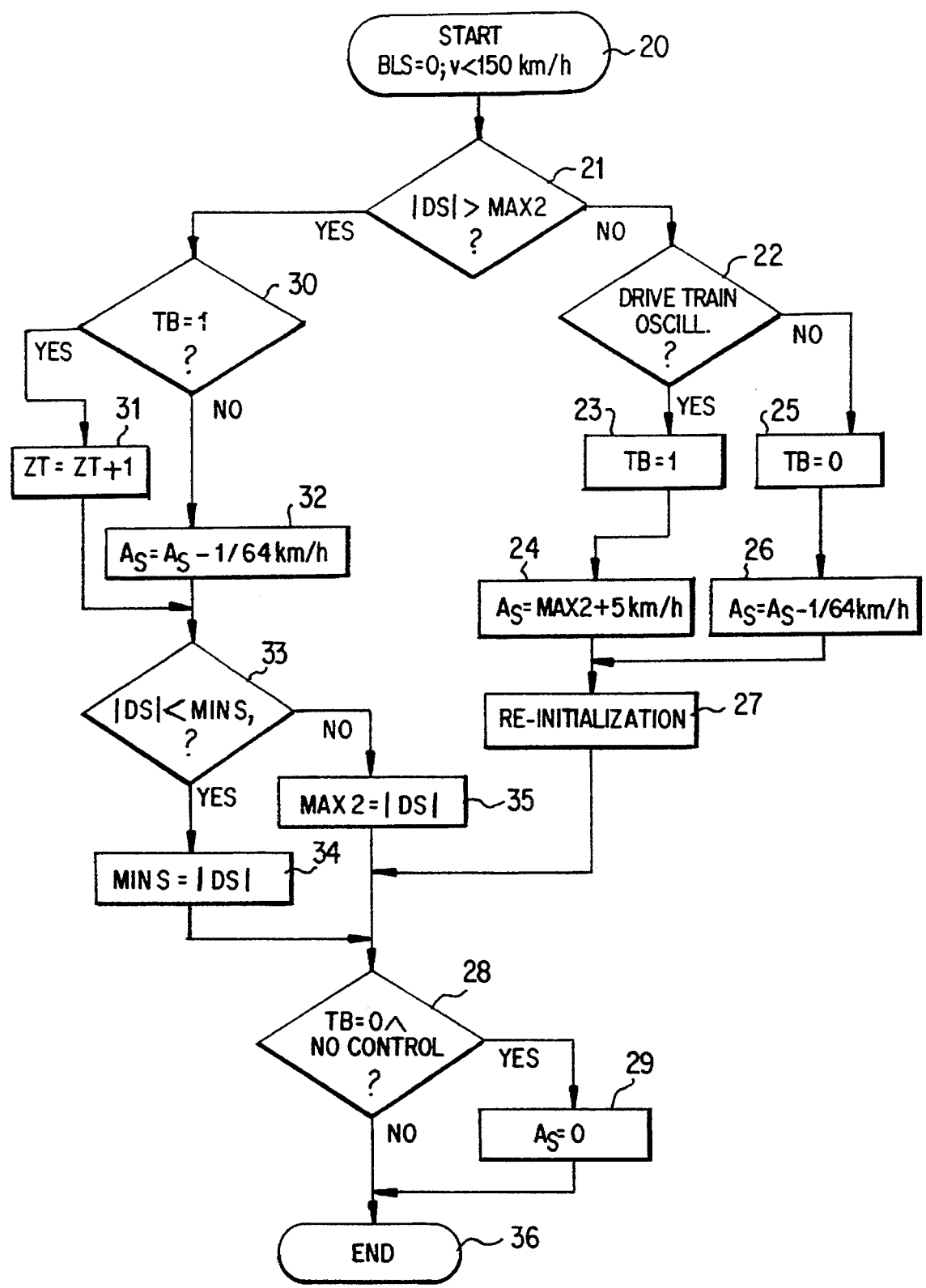
FIG. 2 is a program flow diagram of a part of a method for damping drive train oscillations within an electronic traction control system for a motor vehicle.

The program flow diagram shown in FIG. 2 represents a further part of the complete flow diagram of an electronic traction control system. This part of the method effects the damping of the drive train oscillations explained above resulting from overshoots in the traction-increasing brake interventions at the low-adhesion wheel and occurring, in particular, in the case of a slip/friction coefficient characteristic which exhibits a maximum, such, for example, as occurs with ice having an adhesion maximum or with wet grass as the driving surface condition.

As in the above case where the pull-away tramping effect is damped, this part of the method which damps the drive train oscillations begins with a starting Step 20 which intervenes in each traction control cycle when no driver-induced braking procedure is present. The starting Step 20 again, furthermore, includes the determination of the wheel slip difference (DS) between the driving wheels from the filtered and Ackermann-corrected, measured wheel rotational speeds from the rear wheels, which function as the driving wheels.

A first function of this part of the method shown in FIG. 2 consists in recognizing the presence of drive train oscillation behavior, for which purpose the variation with time of the driving wheel slip difference (DS) is recorded and is analyzed for the presence of a drive train oscillation as follows. This analysis is contained in the interrogation Steps 21 and 22 which follow the starting Step 20. Step 21 first checks whether the magnitude of the slip difference (DS) exhibits, within a specified period of time, a second maximum after a first maximum (and, therefore, an intermediate minimum). For this purpose, a time counter is started after it has been found that the curve of the variation with time of the magnitude of the driving wheel slip difference (DS) has reached a first local maximum. The maximum value is also stored. The time counter is now used to check whether the slip difference passes through a local minimum (MINS) and subsequently a second local maximum (MAX2) during a specified period of time after the first maximum. This period of time is, for example, set to 200 ms and the minimum value and the second maximum value are again stored.

If the slip difference (DS) exhibits such a second maximum (MAX2) within the specified time, the method continues with the next interrogation Step 22 which further analyzes whether the appearance of such a second local maximum within the specified period of time is due to a drive train oscillation behavior. The conclusion is drawn that such an oscillation is present if, in the first place, the difference between the arithmetic average of the two maxima, on one hand, and the minimum value, on the other hand, is above a threshold value, which is set as an example in the present case to 2.7 km/h, and if, in the second place, the magnitude of the difference between the two maximum values is below a further threshold value, which is set in the present case to 4 km/h. If these conditions are satisfied, a bit (TB) marking drive train oscillations is set to "1" in Step 23 in order to indicate to the traction control system the presence of a drive train oscillation.

The activation threshold value ($A_S$) for activating traction-increasing brake interventions on the low-adhesion wheels is then raised by the system in Step 24 and, specifically, in such a way that the new activation threshold value ($A_S$) is set to the value of the last recognized, second maximum (MAX2) plus an offset value for which a value of 5 km/h is selected. A value of 30 km/h is provided as the upper limit to the increase in the slip threshold value. The offset value of 5 km/h is selected such that, because of the increase in the activation threshold ($A_S$), the deactivation threshold for deactivating a particular traction control procedure (which deactivation threshold is fixed in each case so that it is less than the activation threshold ($A_S$) by a certain amount, for example by 2 km/h) is greater than the current magnitude of the slip difference so that the control system switches to pressure reduction and the low-adhesion wheel slip increases, thereby counteracting an increase in the amplitude of the drive train oscillation.

If the drive train oscillation conditions of the interrogation Step 22 are not satisfied, the second maximum recognized (MAX2) cannot be attributed to a drive train oscillation and the associated flag bit (TB) is set to "0" in order to indicate the absence of a drive train oscillation in Step 25. An incremental reduction of the activation slip threshold ($A_S$), which may possibly have been increased in previous cycles, is then undertaken by the system in Step 26 by 1/64 km/h per cycle in the present case, which corresponds approximately to a rate of 1.6 km/s. It can thus be seen that variable, dynamic matching of the activation slip threshold ($A_S$) to the particular driving situation is achieved by the Step 24, which increases the activation threshold value, and by the Step 26, which decreases the activation threshold value.

The activation threshold value is increased when required and is subsequently subjected to gradual decrements so that the activation threshold for traction control is set in the best possible manner, while avoiding drive train oscillations as far as possible, both with respect to the special vehicle physics, in particular the particular axle geometry, and to the instantaneous driving surface conditions. A uniform method of drive train oscillation damping for all vehicle types can thus be used.

After Step 24, which increases the activation threshold, or the Step 26, which subjects the activation threshold to decrements, the method of the present invention continues by being initialized afresh in Step 27. Step 27 is followed by an interrogation Step 28 which determines whether the bit (TB) marking the drive train oscillations is "0" and whether no control is activated. If so, the activation threshold value ($A_S$) is set to the initial value of zero (Step 29) whereupon, just as in the case of a negative interrogation in Step 28, a program cycle is terminated (step 36), and the process is continued with further program parts of the traction control system until the method cycle for damping drive train oscillations is again run through.

If no second maximum in the time variation of the magnitude of the driving wheel slip difference has been recognized in the initial interrogation Step 21, the condition of the bit (TB) marking drive train oscillations is interrogated in a subsequent interrogation Step 30. If this bit is at "1", active drive train oscillation recognition is present and a relevant counter (ZT) is incremented by "1". If, however, the bit is at "0" and, consequently shows that no drive train oscillation recognition is active, the activation threshold value ($A_S$) is subjected to decrements, in a manner analogous to Step 26, in a subsequent Step 32. After Step 31 or 32, Step 33 then interrogates whether the magnitude of the driving wheel slip difference is smaller than the previously present minimum value (MINS). If so, the previous minimum value is replaced in Step 34 by the instantaneous magnitude of the driving wheel slip difference (DS). Otherwise, the value for the second curve maximum (MAX2) is set to this instantaneously present magnitude of the difference in the driving wheel slip in Step 35. The method subsequently continues, after Step 34 or 35, with the interrogation Step 28, as it does after an initialization afresh in Step 27. It may be seen that Steps 34 and 35 are used, subsequent to the corresponding previous interrogations, to follow up the minimum value or the maximum value of the curve so that a later reversal of the shape of the curve, in the form of a local minimum or a local maximum, can be recognized.

It may be seen from the above description of FIG. 2 that the program flow chart provides reliable recognition and effective damping of drive train oscillations in an electronic traction system with brake interventions on the low-adhesion wheels.

Of course, it should be understood that both the part of the method which damps drive train oscillations and the part of the method which damps the pull-away tramping effect or, alternatively, only one of the two parts of the method can be provided within a traction system such as that in the present case. Then, the initialization is carried out in Step 27. During the initialization step, the time counter is sometimes reset to "0". Otherwise, the time counter is limited to a maximum in order to avoid a counter overrun. In addition, the value of the first curve maximum MAX1 is replaced by the value of the second curve maximum MAX2. The value of the second curve maximum is reset to "0". The value of the local minimum is reset by allocating a high speed value, for example 150 km/h, thereto.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of damping control oscillations of a motor vehicle traction control system, comprising the steps of operating with brake intervention on a low-adhesion wheel, and causing an interchange of the low-adhesion wheel to be controlled from one driving wheel to an opposite driving wheel, at the earliest, by determining when a rotational speed of a previous high-adhesion wheel is greater by a specified value than the rotational speed of the previous low-adhesion wheel and further by determining when there is no longer any brake pressure at the previous low-adhesion wheel.

2. The method according to claim 1, further comprising the step of causing an interchange of the low-adhesion wheel to be controlled from one driving wheel to the opposite driving wheel only when a specified hysteresis period has elapsed since a previous interchange.

3. The method according to claim 2, wherein a step of selecting the hysteresis period provides that the hysteric period is higher at relatively high vehicle speeds than with lower vehicle speeds.

4. The method according to claim 1, wherein the step of causing the interchange of the low-adhesion wheel to be controlled from one driving wheel to the opposite driving wheel does not occur with active traction control while vehicle speed is above a specified limiting value.

5. The method according to claim 4, wherein the step of causing an interchange of the low-adhesion wheel to be controlled from one driving wheel to the opposite driving wheel further occurs only when a specified hysteresis period has elapsed since a previous interchange.

6. The method according to claim 4, wherein a step of selecting the hysteresis period provides that the hysteresis period is higher at relatively high vehicle speeds than with lower vehicle speeds.

7. A method of damping control oscillations of a motor vehicle traction control system, comprising the steps of operating with brake intervention on a low-adhesion wheel, recording a time variation of a slip difference between driving wheels recognizing when oscillation behavior of the same, raising an activation threshold value by a specified amount, and thereby activating a traction-increasing brake intervention on the low-adhesion wheel.

8. The method according to claim 7, comprising the further step of setting, when the step of recognizing oscillation behavior has occurred, the activation threshold value to a value which is greater by a specified offset value than a last recognized maximum of a slip difference magnitude curve.

9. The method according to claim 8, wherein the step of setting includes making the offset value greater than a difference between the activation threshold value and a deactivation threshold value which is lower than the activation threshold value.

10. The method according to claim 7, wherein the step of recognizing the oscillation behavior are based on the following conditions:

(a) when, within a specified time, a local minimum and a second local maximum are recorded after a first local maximum in the time variation of the magnitude of the slip difference;

(b) when the magnitude of the difference between the two maximum values is less than a specified limiting value and (c) when the magnitude of the difference between the average value of the two maximum values and the minimum value is above a specified limiting value.

11. The method according to claim 10, including the further step of setting, when the step of recognizing oscillation behavior occurs, the activation threshold value to a value which is greater by a specified offset value than a last recognized maximum of a slip difference magnitude curve.

12. The method according to claim 11, wherein the step of setting includes making the offset value greater than a difference between the activation threshold value and a deactivation threshold value which is lower than the activation threshold value.

13. The method according to claim 7, wherein the step of activating intervention on the low-adhesion wheel, comprises the further step of causing an interchange of the low-adhesion wheel to be controlled from one driving wheel to an opposite driving wheel, at the earliest, by determining when a rotational speed of a previous high-adhesion wheel is greater by a specified value than the rotational speed of the previous low-adhesion wheel and by further determining when there is no longer any brake pressure at the previous low-adhesion wheel.

14. The method according to claim 13, further comprising the step of causing an interchange of the low-adhesion wheel to be controlled from one driving wheel to the opposite driving wheel only when a specified hysteresis period has elapsed since a previous interchange.

15. The method according to claim 14, wherein a step of selecting the hysteresis period provides that the hysteresis period is higher at relatively high vehicle speeds than with lower vehicle speeds.

16. The method according to claim 15, wherein the step of causing the interchange of the low-adhesion wheel to be controlled from one driving wheel to the opposite driving wheel does not occur with active traction control while vehicle speed is above a specified limiting value.

* * * * *